(12) United States Patent
Chen et al.

(10) Patent No.: US 11,846,540 B2
(45) Date of Patent: Dec. 19, 2023

(54) METHOD FOR ADJUSTING SLEEP TIME BASED ON SENSING DATA AND ELECTRONIC DEVICE

(71) Applicant: Industrial Technology Research Institute, Hsinchu (TW)

(72) Inventors: Chang-Hsien Chen, Tainan (TW); Yi-Cheng Chung, Penghu County (TW); Bo-Yi Ye, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/705,386

(22) Filed: Mar. 28, 2022

(65) Prior Publication Data

US 2023/0213378 A1 Jul. 6, 2023

(30) Foreign Application Priority Data

Jan. 3, 2022 (TW) ................................. 111100048

(51) Int. Cl.
*G01H 17/00* (2006.01)

(52) U.S. Cl.
CPC .................................. *G01H 17/00* (2013.01)

(58) Field of Classification Search
CPC ....................................................... G01H 17/00
See application file for complete search history.

(56) References Cited

U.S. PATENT DOCUMENTS 9,282,582 B1 3/2016 Dunsbergen et al.
10,660,040 B2 5/2020 Su
11,006,200 B2 5/2021 El Guindi et al.
2012/0096288 A1* 4/2012 Bates ...................... G06F 1/206
  713/320

(Continued)

FOREIGN PATENT DOCUMENTS

CN 103220008 12/2015
CN 108958447 12/2018

(Continued)

OTHER PUBLICATIONS

Gaoyang Shan et al., "Advertisement Interval to Minimize Discovery Time of Whole BLE Advertisers", IEEE Access (vol. 6), Mar. 19, 2018, p. 17817-17825.
Jong-Woon Yoo et al., "A Cooperative Clustering Protocol for Energy Saving of Mobile Devices with WLAN and Bluetooth Interfaces", IEEE Transactions on Mobile Computing, Sep. 2, 2010, pp. 491-504.
Martin C. Ekstrom et al., "A Bluetooth Radio Energy Consumption Model for Low-Duty-Cycle Applications", IEEE Transactions on Instrumentation and Measurement, Dec. 2, 2011, pp. 609-617.

(Continued)

Primary Examiner — Natalie Huls
Assistant Examiner — Cynthia L Davis
(74) Attorney, Agent, or Firm — JCIPRNET (57) ABSTRACT

A method for adjusting sleep time based on sensing data and an electronic device are provided. In the method, a sensor is disabled in a sleep duration of the $i^{th}$ operation cycle, and the sensor is enabled in a detection duration of the $i^{th}$ operation cycle. Multiple sensing data corresponding to the $i^{th}$ operation cycle are obtained from the sensor. A detection duration and a sleep duration of the $i+1^{th}$ operation cycle are determined based on the sensing data obtained in the detection duration of the $i^{th}$ operation cycle.

23 Claims, 5 Drawing Sheets

(56) References Cited

U.S. PATENT DOCUMENTS

| | | | |
|---|---|---|---|
| 2015/0230171 A1 | 8/2015 | Sun | |
| 2017/0344302 A1 | 11/2017 | Blicharski et al. | |
| 2018/0140233 A1* | 5/2018 | Lacirignola | A61B 5/6814 |
| 2018/0216990 A1* | 8/2018 | Rothwell | G01H 1/00 |

FOREIGN PATENT DOCUMENTS

| | | |
|---|---|---|
| CN | 109901694 | 6/2019 |
| CN | 110908719 | 3/2020 |
| TW | 200819968 | 5/2008 |
| TW | 201346511 | 11/2013 |
| TW | 201518926 | 5/2015 |

OTHER PUBLICATIONS

Riccardo Venanzi et al., "Fog-Driven Context-Aware Architecture for Node Discovery and Energy Saving Strategy for Internet of Things Environments", IEEE Access (vol. 7), Sep. 2, 2019, p. 134173-134186.

Jing-Ho Chen et al., "Energy-Efficient Scheduling for Multiple Latency-Sensitive Bluetooth Low Energy Nodes", IEEE Sensors Journal, Oct. 4, 2017, pp. 849-859.

"Office Action of Taiwan Counterpart Application", dated Jun. 29, 2022, p. 1-p. 3.

* cited by examiner

METHOD FOR ADJUSTING SLEEP TIME BASED ON SENSING DATA AND ELECTRONIC DEVICE

CROSS-REFERENCE TO RELATED APPLICATION

This application claims the priority benefit of Taiwanese application no. 111100048, filed on Jan. 3, 2022. The entirety of the above-mentioned patent application is hereby incorporated by reference herein and made a part of this specification.

TECHNICAL FIELD

The technical field relates to a method for adjusting sleep time based on sensing data and an electronic device.

BACKGROUND

The service life of existing industrial motors may be up to 20 years under normal conditions, and there are many ways to diagnose motors for maintenance/repair. Generally, based on measured vibration data of motors, and supported by time-frequency analysis technologies and fuzzy neural network algorithms, motor diagnosis may accurately identify more than 20 types of failures for key components such as spindles, bearings, gearboxes, and motors.

At present, measurement and collection of motor-related vibration data are mostly performed by Bluetooth low energy (BLE) vibration measurement products, and built-in batteries of these vibration measurement products usually have a capacity of only approximately 2000 mAh, which merely allows these vibration measurement products to operate for approximately 5 to 6 days under normal full-time operations. Therefore, maintenance and operations personnel are required to frequently confirm the battery status or replace batteries, which causes a considerable maintenance burden on system integrators and users.

SUMMARY

The disclosure provides a method for adjusting sleep time based on sensing data and an electronic device that may be used to solve the above technical problem.

One of exemplary embodiments provides a method for adjusting sleep time based on sensing data, adapted for an electronic device. In the method, a sensor is disabled in a sleep duration of an $i^{th}$ operation cycle among multiple operation cycles, and i is an integer greater than 1. In a detection duration of the $i^{th}$ operation cycle, the sensor is enabled, and multiple sensing data corresponding to the $i^{th}$ operation cycle are obtained from the sensor. The sensing data corresponding to the $i^{th}$ operation cycle are obtained by the sensor sensing a target device in the detection duration of the $i^{th}$ operation cycle. A detection duration and a sleep duration of an $i+1^{th}$ operation cycle among the operation cycles are determined based on the sensing data obtained in the detection duration of the $i^{th}$ operation cycle.

One of exemplary embodiments provides an electronic device for adjusting sleep time based on sensing data, including a storage circuit and a processor. The storage circuit stores a code. The processor is coupled to the storage circuit and accesses the code to execute the following steps. A sensor is disabled in a sleep duration of an $i^{th}$ operation cycle among multiple operation cycles, and i is an integer greater than 1. In a detection duration of the $i^{th}$ operation cycle, the sensor is enabled, and multiple sensing data corresponding to the $i^{th}$ operation cycle are obtained from the sensor. The sensing data corresponding to the $i^{th}$ operation cycle are obtained by the sensor sensing a target device in the detection duration of the $i^{th}$ operation cycle. A detection duration and a sleep duration of an $i+1^{th}$ operation cycle among the operation cycles are determined based on the sensing data obtained in the detection duration of the $i^{th}$ operation cycle.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1A:
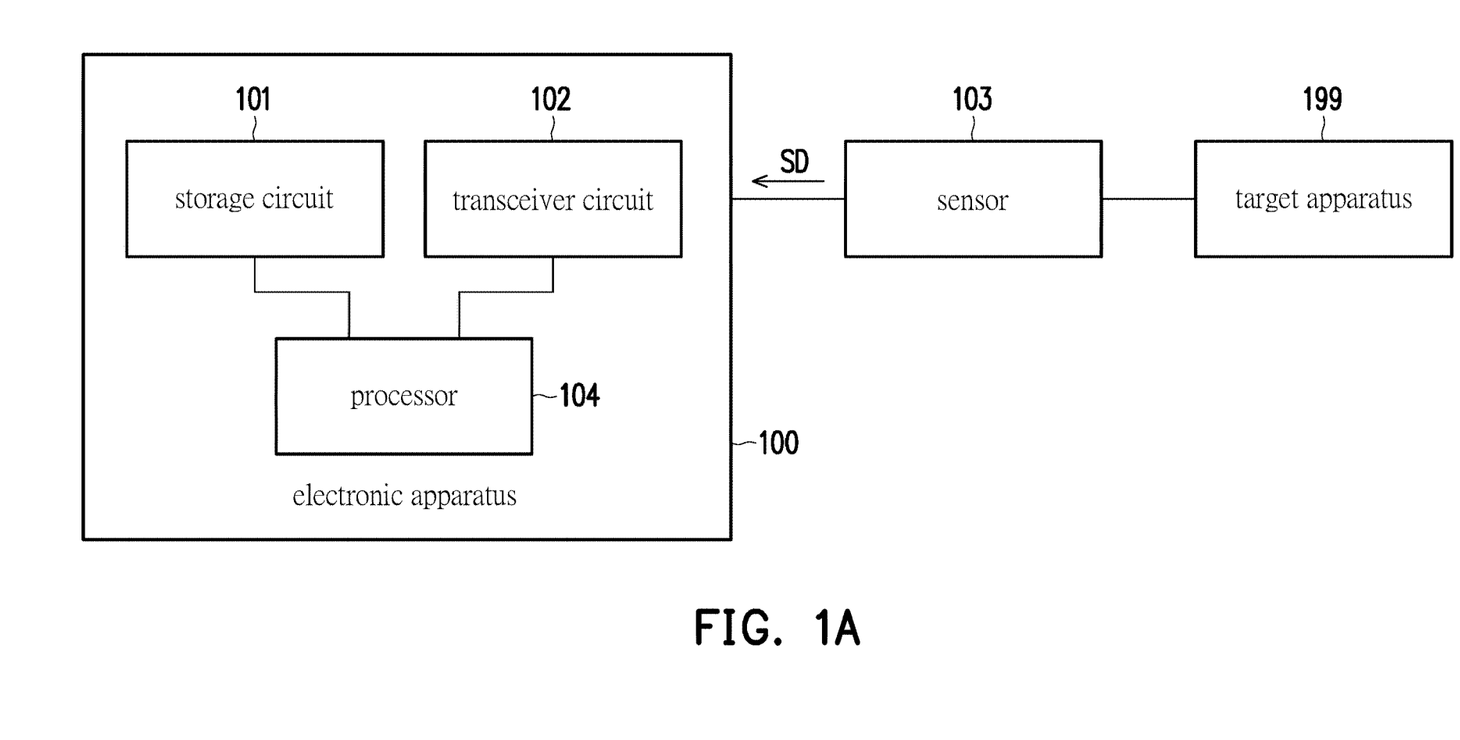
FIG. 1A is a schematic diagram of an electronic device according to an embodiment of the disclosure.

Please refer to FIG. 1A. FIG. 1A is a schematic diagram of an electronic device according to an embodiment of the disclosure. In different embodiments, an electronic device 100 may, for example, be connected to a sensor 103 and receive sensing data SD from the sensor 103 measuring a target device 199. In some embodiments, the electronic device 100 is, for example, a communication device such as a Bluetooth low energy (BLE) device, which may be used to transmit the sensing data SD obtained from the sensor 103 to other management device (not illustrated) managing the target device 199, such that the management device may gain the operation status of the target device 199 according to the sensing data SD.

In an embodiment, the target device 199 is, for example, a motor device, and the sensor 103 is, for example, a vibration measurement element that may measure vibration data from the target device 199 as the sensing data SD. In addition, the electronic device 100 may, for example, transmit the sensing data SD to the aforementioned management device. In this case, the management device may be, for example but not limited to, a server for managing the target device 199 and may perform relevant motor diagnosis on the target device 199 based on the sensing data SD.

In other embodiments, the target device 199 may also be a device providing changing electronic signals (such as voltage, current, and the like) corresponding to the surrounding environment, and the sensor 103 is, for example, a signal measurement product that may measure relevant electronic signals from the target device 199 as the sensing data SD. In this case, the aforementioned management device is, for example but not limited to, a server for managing the target device 199 and may gain the operation status of the target device 199 based on the sensing data SD.

As shown in FIG. 1A, the electronic device 100 may include a storage circuit 101, a transceiver circuit 102, and a processor 104. The storage circuit 101 is, for example, any type of a fixed or mobile random-access memory (RAM), a read-only memory (ROM), a flash memory, a hard disk, other similar device, or a combination of these devices that may be used to record multiple codes or modules.

In different embodiments, the transceiver circuit 102 may be implemented as a corresponding communication module, which is, for example but not limited to, a Bluetooth module, a mobile communication module, and the like, according to the communication protocol adopted by the electronic device 100. To facilitate description, it is assumed in the following paragraphs that the electronic device 100 is a BLE device, and the transceiver circuit 102 may be accordingly implemented as a BLE communication module, but the disclosure is not limited thereto.

The processor 104 is coupled to the storage circuit 101 and the transceiver circuit 102, and may be a general-purpose processor, a special-purpose processor, a traditional processor, a digital signal processor, multiple microprocessors, one or more microprocessors combined with digital signal processor cores, a controller, a microcontroller, an application specific integrated circuit (ASIC), a field programmable gate array (FPGA), any other type of an integrated circuit, a state machine, a processor or similar products based on an advanced RISC machine (ARM).

Figure 1B:
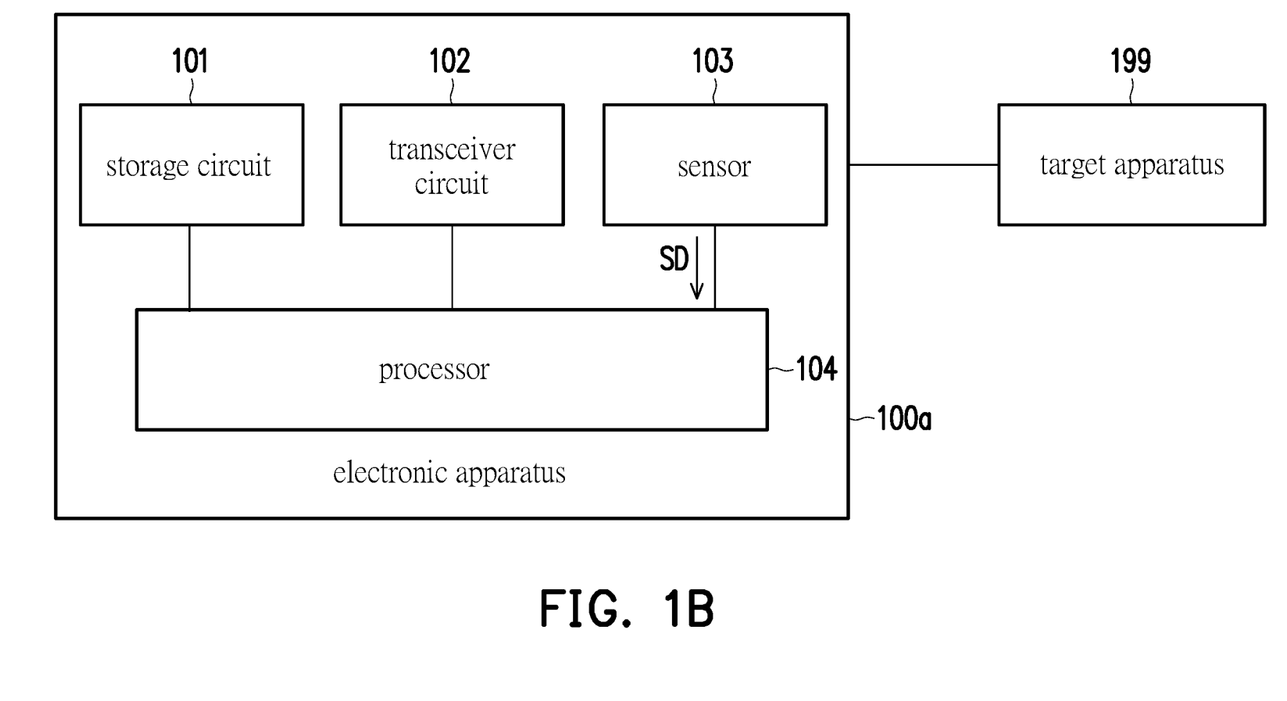
FIG. 1B is a schematic diagram of another electronic device according to FIG. 1A.

Please refer to FIG. 1B. FIG. 1B is a schematic diagram of another electronic device according to FIG. 1A. The difference between this embodiment and FIG. 1A is that an electronic device 100a of this embodiment further includes the sensor 103, and the sensor 103 may provide the relevant sensing data SD to the processor 104 after measuring the target device 199. Next, the processor 104 may, for example but not limited to, transmit the sensing data SD to the aforementioned management device through the transceiver circuit 102.

In the embodiment of the disclosure, the processor 104 may access the module and the code recorded in the storage circuit 101 to implement the method for adjusting sleep time based on sensing data provided by the disclosure, and the details are as follows.

Figure 2:
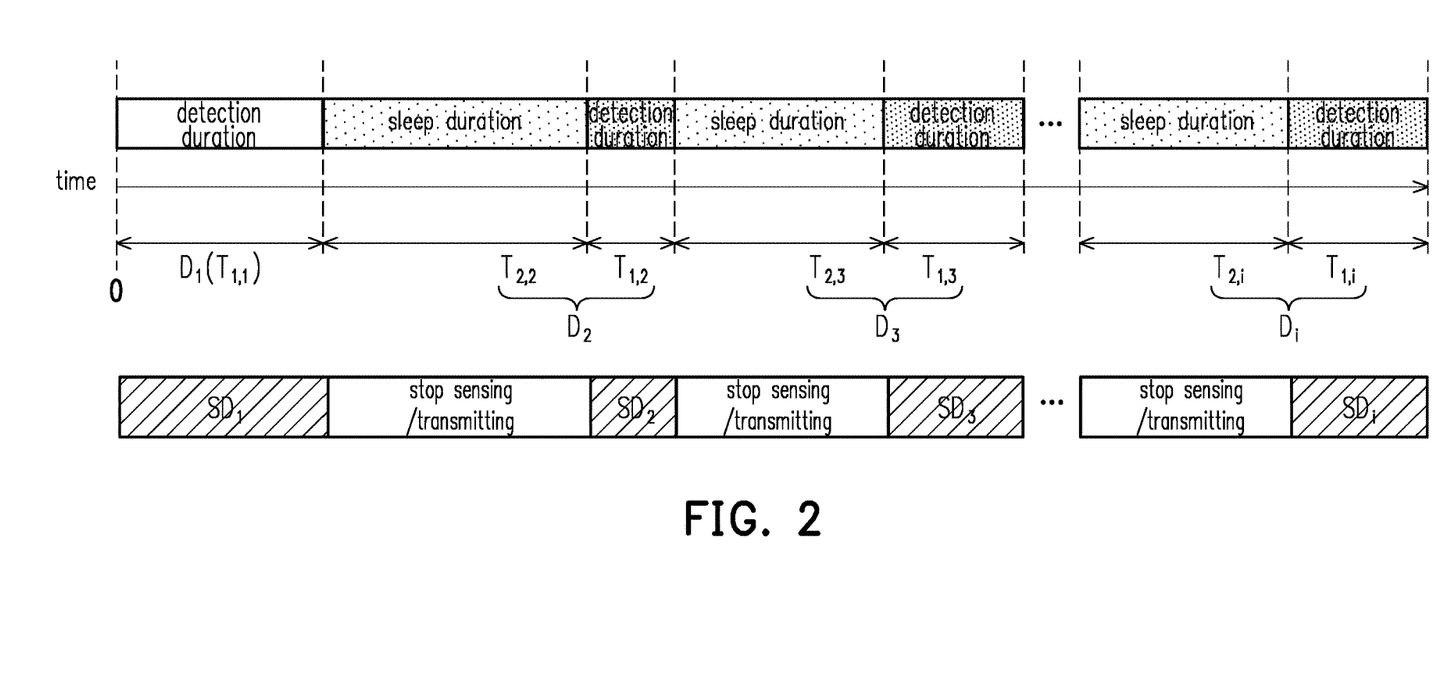
FIG. 2 is an application scenario diagram according to an embodiment of the disclosure.

Please refer to FIG. 2. FIG. 2 is an application scenario diagram according to an embodiment of the disclosure. In FIG. 2, a time axis may be divided into multiple operation cycles, among which the first operation cycle may be referred to as an operation cycle $D_1$, and the $i^{th}$ operation cycle may be referred to as an operation cycle $D_i$ (i is an integer greater than 1).

According to FIG. 2, the operation cycle $D_1$ may only include a detection duration $T_{1,1}$, while the operation cycle $D_i$ may include a detection duration $T_{1,i}$, and a sleep duration $T_{2,i}$. For example, an operation cycle $D_2$ (i.e., the second operation cycle) may include a detection duration $T_{1,2}$ and a sleep duration $T_{2,2}$, while an operation cycle $D_3$ (i.e., the third operation cycle) may include a detection duration $T_{1,3}$ and a sleep duration $T_{2,3}$, but the disclosure is not limited thereto.

In the embodiments of the disclosure, in the detection duration of each operation cycle, the processor 104 may enable the sensor 103 so that the sensor 103 may measure the target device 199 to obtain the sensing data SD and then provide the relevant sensing data SD to the processor 104. For example, in the detection duration $T_{1,1}$, the sensor 103 may provide sensing data $SD_1$ to the processor 104; in the detection duration $T_{1,2}$, the sensor 103 may provide sensing data $SD_2$ to the processor 104; in the detection duration $T_{1,3}$, the sensor 103 may provide sensing data $SD_3$ to the processor 104; in the detection duration $T_{1,i}$, the sensor 103 may provide sensing data $SD_i$ to the processor 104.

In the embodiments of the disclosure, the processor 104 may adaptively adjust the detection duration $T_{1,i}$ and the sleep duration $T_{2,i}$ of the $i^{th}$ operation cycle based on the provided method, and the details are as follows.

Figure 3:
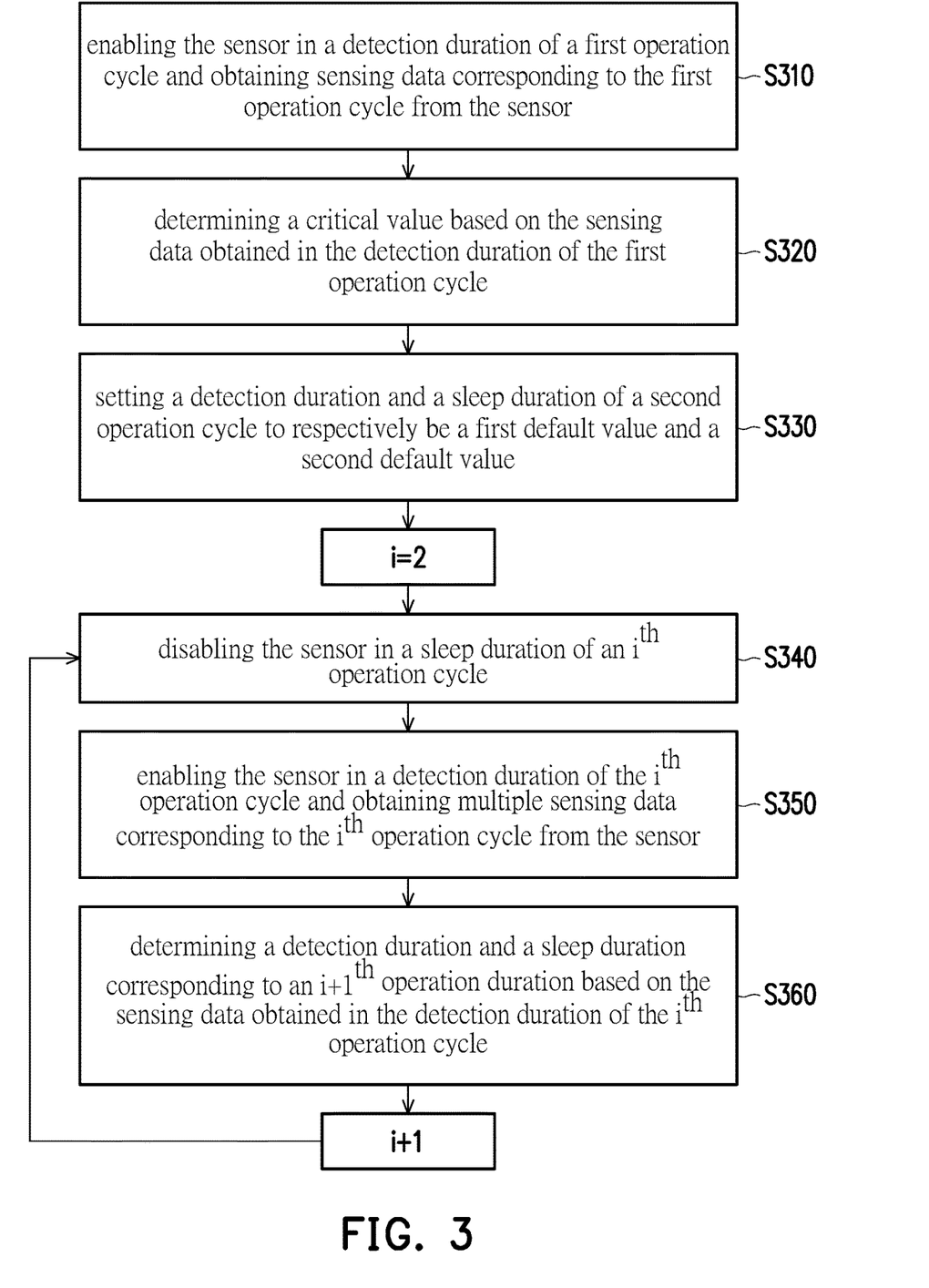
FIG. 3 is a flow chart of a method for adjusting sleep time based on sensing data according to an embodiment of the disclosure.

Please refer to FIG. 3. FIG. 3 is a flow chart of a method for adjusting sleep time based on sensing data according to an embodiment of the disclosure. The method of this embodiment may be executed by the processor 104 of the electronic device 100 in FIG. 1A or the processor 104 of the electronic device 100a in FIG. 1B. The details of each step in FIG. 3 are described below with reference to the elements shown in FIG. 1A and FIG. 1B.

First, in step S310, the processor 104 enables the sensor 103 in the detection duration $T_{1,1}$ of the first operation cycle (i.e., the operation cycle $D_1$) and obtains the sensing data $SD_1$ corresponding to the first operation cycle from the sensor 103.

In step S320, the processor 104 determines a critical value TH based on the sensing data $SD_1$ obtained in the detection duration $T_{1,1}$ of the first operation cycle (i.e., the operation cycle $D_1$). In an embodiment, the processor 104 may determine a statistical property value based on the sensing data $SD_1$ as the critical value TH.

In an embodiment, the processor 104 may obtain the maximum value in the sensing data $SD_1$ and use a certain percentage (for example, 90%) of the maximum value as the corresponding statistical property value (i.e., the threshold value TH). In another embodiment, the processor 104 may, for example but not limited to, estimate a mean (represented by m) and a standard deviation (represented by s) of the sensing data $SD_1$ and may use m+s or m+2s as the corresponding statistical property value (i.e., the critical value TH). In other embodiments, a designer may use other methods to determine/select the critical value TH based on the sensing data $SD_1$ according to requirements, without being limited to the above embodiment.

Next, in step S330, the processor 104 respectively sets the detection duration $T_{1,2}$ and the sleep duration $T_{2,2}$ of the second operation cycle (i.e., the operation cycle $D_2$) as a first default value and a second default value.

In an embodiment, assuming that the time length of each operation cycle is a fixed value (represented by T), the processor 104 may determine the first and the second default values according to a default energy-saving ratio. For example, assuming that the default energy-saving ratio is a:b, the processor 104 may respectively set the first and the second default values as $$\frac{a}{(a+b)} \times T \text{ and } \frac{b}{(a+b)} \times T.$$

For example, assuming that T is 60 seconds, a is 1, and b is 9, the processor 104 may calculate the first default value to be 6 seconds $$\left(\text{i.e., } \frac{1}{(1+9)} \times 60 \text{ seconds}\right)$$

and calculate the second default value to be 54 seconds $$\left(\text{i.e., } \frac{9}{(1+9)} \times 60 \text{ seconds}\right),$$

but the disclosure is not limited thereto. In other embodiments, a designer may select a required default energy-saving ratio according to requirements without being limited to the above embodiment.

In addition, in other embodiments, the designer may further arbitrarily select required values as the first and the second default values according to requirements without being limited to the above embodiment.

After step S330, the processor 104 may set i to be 2 and recursively execute steps S340 to S360 in FIG. 3 over time.

In step S340, in the sleep duration $T_{2,i}$ of the $i^{th}$ operation cycle (i.e., the operation cycle $D_i$), the processor 104 disables the sensor 103. In an embodiment, the processor 104 may further disable the transceiver circuit 102 in the sleep duration $T_{2,i}$.

In this case, the sensor 103 may stop sensing the target device 199, and the transceiver circuit 102 may also stop transmitting signals, thereby saving power in the sleep duration $T_{2,i}$.

In step S350, in the detection duration $T_{1,i}$ of the $i^{th}$ operation cycle (i.e., the operation cycle $D_i$), the processor 104 enables the sensor 103 and obtains the sensing data $SD_i$ corresponding to the $i^{th}$ operation cycle from the sensor 103.

Next, in step S360, the processor 104 determines a detection duration $T_{1,i+1}$ and a sleep duration $T_{2,i+1}$ corresponding to the i+1th operation cycle (i.e., an operation cycle $D_{i+1}$) among the operation cycles based on the sensing data $SD_i$ obtained in the detection duration $T_{1,i}$ of the $i^{th}$ operation cycle (i.e., the operation cycle $D_i$).

In an embodiment, the processor 104 may determine whether specific sensing data satisfying a specific condition exist among the sensing data $SD_j$ corresponding to the $i^{th}$ operation cycle (i.e., the operation cycle $D_i$). If so, the processor 104 may execute at least one of setting the sleep duration $T_{2,i+1}$ to be less than the sleep duration $T_{2,i}$ and setting the detection duration $T_{1,i+1}$ to be greater than the detection duration $T_{1,i}$ (hereinafter referred to as a first flow). If not, the processor 104 may execute at least one of setting the sleep duration $T_{2,i+1}$ to be greater than the sleep duration $T_{2,i}$ and setting the detection duration $T_{1,i+1}$ to be less than the detection duration $T_{1,i}$ (hereinafter referred to as a second flow).

In an embodiment, the processor 104 may determine whether any of the sensing data $SD_i$ of the $i^{th}$ operation cycle (i.e., the operation cycle $D_i$) exceeds the critical value TH. In response to determining that any of the sensing data $SD_j$ exceeds the critical value TH, the processor 104 may determine that specific sensing data satisfying the specific condition exist among the sensing data $SD_j$. On the other hand, in response to determining that all the sensing data $SD_j$ do not exceed the critical value TH, the processor 104 may determine that specific sensing data satisfying the specific condition do not exist among the sensing data $SD_j$, but the disclosure is not limited thereto.

In the first flow, when the sleep duration $T_{2,i+1}$ is set to be less than the sleep duration $T_{2,i}$, the processor 104 may set the sleep duration $T_{2,i+1}$ to be any value less than the sleep duration $T_{2,i}$. In this way, the sleep duration of the operation cycle $D_1$ may be accordingly shorter than the sleep duration of the operation cycle $D_i$. Moreover, when the detection duration $T_{1,i+1}$ is set to be greater than the detection duration $T_{1,i}$, the processor 104 may set the detection duration $T_{1,i+1}$ to be any value greater than the detection duration $T_{1,i}$. In this way, the detection duration of the operation cycle $D_{i+1}$ may be accordingly longer than the detection duration of the operation cycle $D_i$.

Furthermore, in the first flow, if any of the sensing data $SD_i$ exceeds the critical value TH, then the operation of the target device 199 may be abnormal/unstable. Therefore, a longer detection duration and/or a shorter sleep duration may be required in the operation cycle $D_{i+1}$ for the sensor 103 to obtain more sensing data $SD_{i+1}$.

In addition, in the second flow, when the sleep duration $T_{2,i+1}$ is set to be greater than the sleep duration $T_{2,i}$, the processor 104 may set the sleep duration $T_{2,i+1}$ to be any value greater than the sleep duration $T_{2,i}$. In this way, the sleep duration of the operation cycle $D_{i+1}$ may be accordingly longer than the sleep duration of the operation cycle $D_i$. Moreover, when the detection duration $T_{1,i+1}$ is set to be less than the detection duration $T_{1,i}$, the processor 104 may set the detection duration $T_{1,i+1}$ to be any value less than the detection duration $T_{1,i}$. In this way, the detection duration of the operation cycle $D_{i+1}$ may be accordingly shorter than the detection duration of the operation cycle $D_1$.

Furthermore, in the second flow, if all the sensing data $SD_i$ do not exceed the critical value TH, then the operation of the target device 199 has been stabilized. Therefore, the operation cycle $D_{i+1}$ may be adjusted to have a shorter detection duration and/or a longer sleep duration. In this way, the power consumption of the sensor 103 and the transceiver circuit 102 may be reduced, and thus the service life of the electronic device 100 and/or the sensor 103 may be prolonged.

As mentioned above, in some embodiments, the time length of each operation cycle is the fixed value T. In this case, both the sum of the detection duration $T_{1,i}$ and the sleep duration $T_{2,i}$ and the sum of the detection duration $T_{1,i+1}$ and the sleep duration $T_{2,i+1}$ are equal to T. Correspondingly, the first flow and the second flow may be adjusted as follows.

In the first flow, when the time length of each operation cycle is the fixed value T, the processor 104 may set the detection duration $T_{1,i+1}$ to be $T_{1,i} \times K$ for setting the detection duration $T_{1,i+1}$ to be greater than the detection duration $T_{1,i}$. K is an energy-saving coefficient greater than 1, and $T_{1,i+1} \leq T_{1,i} + T_{2,i}$. In addition, the processor 104 may set the sleep duration $T_{2,i+1}$ to be $T_{2,i} - (T_{1,i+1} - T_{1,i})$ for setting the sleep duration $T_{2,i+1}$ to be less than the sleep duration $T_{2,i}$, but the disclosure is not limited thereto.

In the second flow, when the time length of each operation cycle is the fixed value T, the processor 104 may set the detection duration $T_{1,i+1}$ to be $T_{1,i}/K$ for setting the detection duration $T_{1,i+1}$ to be less than $T_{1,i}$. In addition, the processor 104 may set the sleep duration $T_{2,i+1}$ to be $T_{2,i} + (T_{1,i} - T_{1,i+1})$ for setting the sleep duration $T_{2,i+1}$ to be greater than the sleep duration $T_{2,i}$.

In the second flow, before determining the detection duration $T_{1,i+1}$ and/or the sleep duration $T_{2,i+1}$ according to the above teaching, the processor 104 may further determines a current energy-saving rate $P_i$ corresponding to the $i^{th}$ operation cycle (i.e., the operation cycle $D_i$) according to the detection duration $T_{1,i}$ and the sleep duration $T_{2,i}$. In an embodiment, the processor 104 may, for example but not limited to, estimate $$\frac{T_{2,i}}{T_{1,i} + T_{2,i}}$$

as the current energy-saving rate $P_i$ (i.e., the ratio of the sleep duration $T_{2,i}$ in the operation cycle $D_i$). Next, the processor 104 may determine whether the current energy-saving rate $P_i$ has reached an upper threshold. In different embodiments, the designer may set the upper threshold to any required value according to requirements.

In the second flow, in response to determining that the current energy-saving rate $P_i$ has reached the upper threshold, the processor 104 may set the sleep duration $T_{2,i+1}$ to be equal to the sleep duration $T_{2,i}$ and set the detection duration $T_{1,i+1}$ to be equal to the detection duration $T_{1,i}$. In other words, the processor 104 may respectively make the detection duration and the sleep duration of the operation cycle $D_{i+1}$ equal to the detection duration and the sleep duration of the operation cycle $D_i$. In this way, it may be avoided that the detection duration is endlessly shortened over time and results in a certain operation cycle only including the sleep duration.

On the other hand, in response to determining that the current energy-saving rate $P_i$ has not reached the upper threshold, the processor 104 may accordingly execute the setting of the detection duration $T_{1,i+1}$ and/or the setting of the sleep duration $T_{2,i+1}$ as taught in the second flow, but the disclosure is not limited thereto.

In light of the above, when i is 2, the processor 104 may execute steps S340 to S360 to determine the detection duration $T_{1,3}$ and the sleep duration $T_{2,3}$ of the third operation cycle (i.e., the operation cycle $D_3$). Next, the processor 104 may set i to be i+1 (i.e., i turns to be 3) and execute steps S340 to S360 again to determine a detection duration $T_{1,4}$ and a sleep duration $T_{2,4}$ of the fourth operation cycle (i.e., an operation cycle $D_4$). Based on this, the processor 104 may adaptively adjust the detection duration and the sleep duration of each operation cycle over time for saving power when the target device 199 is relatively stable or obtaining more sensing data in a longer detection duration when the target device 199 is relatively unstable.

Figure 4:
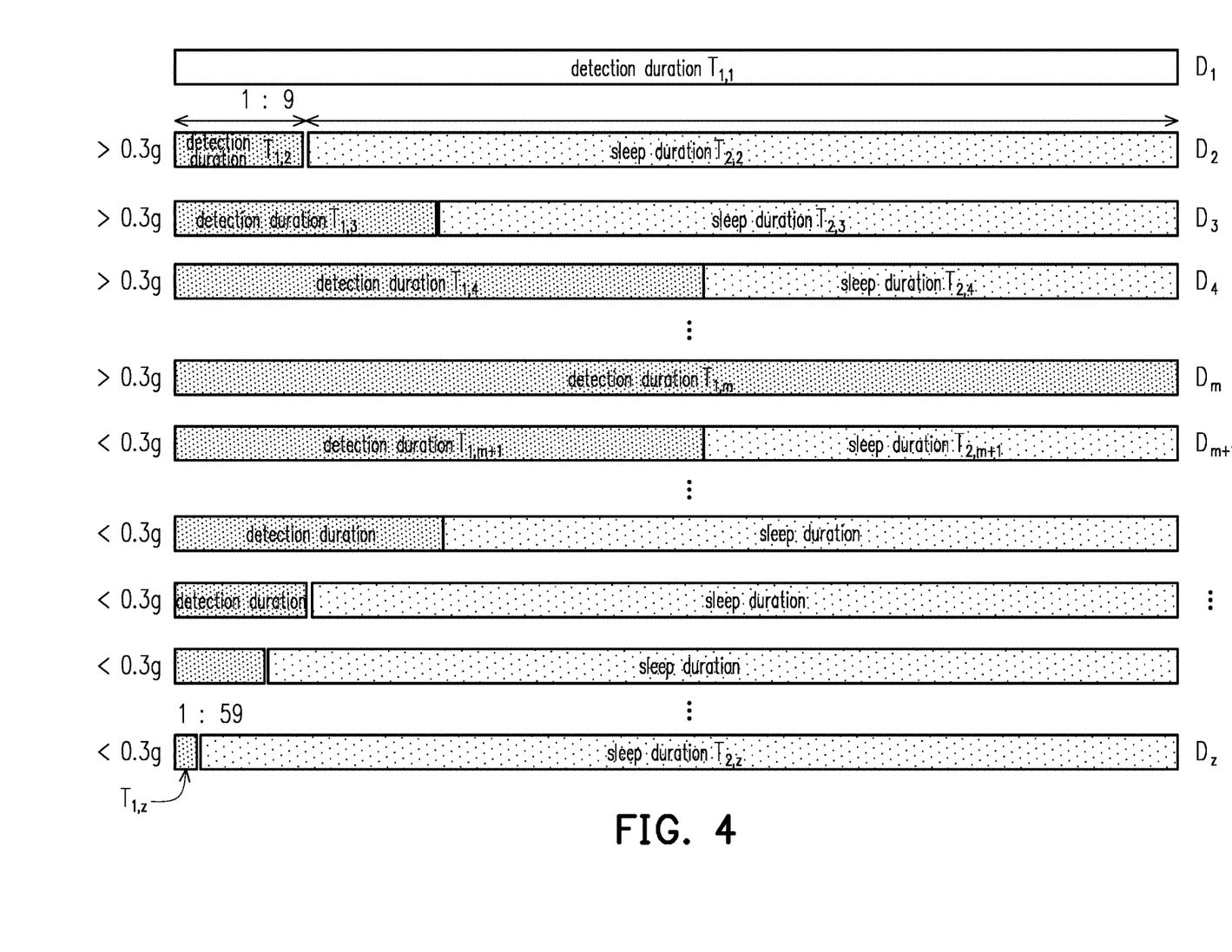
FIG. 4 is an application scenario diagram according to an embodiment of the disclosure.

Please refer to FIG. 4. FIG. 4 is an application scenario diagram according to an embodiment of the disclosure. In the embodiment of FIG. 4, it is assumed that the critical value TH is 0.3 g (g is the acceleration of gravity), the energy-saving coefficient K is 2, the default energy-saving ratio is 1:9, the upper threshold is 98%, and the length of each operation cycle is the fixed value T, but the disclosure is not limited thereto.

According to FIG. 4, after determining the critical value TH based on the sensing data $SD_1$ of the operation cycle $D_1$, the processor 104 may determine that the ratio of the detection duration $T_{1,2}$ to the sleep duration $T_{2,2}$ of the operation cycle $D_2$ is 1:9 according to the default energy-saving ratio. Next, assuming that any of the sensing data $SD_2$ measured in the detection duration $T_{1,2}$ exceeds the critical value TH, the processor 104 may set the detection duration $T_{1,3}$ to be $T_{1,2} \times K$ and set the sleep duration $T_{2,3}$ to be $T_{2,2}-(T_{1,3}-T_{1,2})$ according to the teaching of the first flow.

Next, assuming that any of the sensing data $SD_3$ measured in the detection duration $T_{1,3}$ exceeds the critical value TH, the processor 104 may set the detection duration $T_{1,4}$ to be $T_{1,3} \times K$ and set the sleep duration $T_{2,4}$ to be $T_{2,3}-(T_{1,4}-T_{1,3})$ according to the teaching of the first flow.

In FIG. 4, assuming that the sensing data corresponding to the detection durations $T_{1,4}$ to $T_{1,m-1}$ all have sensing data exceeding the critical value TH, the processor 104 may repeatedly execute the teaching of the first flow to continuously prolong the detection duration and shorten the sleep duration.

In FIG. 4, it is assumed that only a detection duration $T_{1,m}$ is substantially left in an operation cycle $D_m$ (i.e., a sleep duration $T_{2,m}$ is approximately 0) and the target device 199 at this time has new operational properties due to some reasons such as undergoing maintenance and the like. At this time, all of sensing data $SD_m$ measured in the detection duration $T_{1,m}$ may not exceed the critical value TH. In this case, the processor 104 may set a detection duration $T_{1,m+1}$ to be $T_{1,m}/K$ and set a sleep duration $T_{2,m+1}$ to be $T_{2,m}+(T_{1,m}-T_{1,m+1})$.

Next, assuming that no sensing data exceeding the critical value TH exist among the sensing data corresponding to the detection durations $T_{1,m+1}$ to $T_{1,z-1}$, the processor 104 may repeatedly execute the teaching of the second flow to continuously shorten the detection duration and prolong the sleep duration.

In FIG. 4, it is assumed that in an operation cycle $D_z$, a current energy-saving rate $P_z$ corresponding to a detection duration $T_{1,z}$ and a sleep duration $T_{2,z}$ is 98.33% (i.e., 59/1+59). In this case, since the current energy-saving rate $P_z$ has exceeded the upper threshold (i.e., 98%), the processor 104 may set a sleep duration $T_{2,z+1}$ to be equal to the sleep duration $T_{2,z}$ and set a detection duration $T_{1,z+1}$ to be equal to the detection duration $T_{1,z}$. In other words, the processor 104 may respectively make the detection duration and the sleep duration of the operation cycle $D_{z+1}$ equal to the detection duration and the sleep duration of the operation cycle $D_z$.

Upon testing, if T is 60 seconds and the processor 104 of the electronic devices 100 and 100a (BLE devices) continues to operate in the scenario of FIG. 4 (i.e., the ratio of the detection duration to the sleep duration in the subsequent operation cycles remains 1:59), the power consumption respectively corresponding to the operation cycle $D_z$ and the subsequent operation cycles is approximately 0.23 mA (i.e., 0 mA×0.9833+14 mA×0.0166). In this case, a battery of 2000 mAh may keep the sensor 103 operating for 8695 hours, or approximately 362 days. Compared with full-time operation, the method in the disclosure may effectively prolong the battery service life of the sensor 103, thereby improving the convenience of use for system integrators and users.

In summary, in the embodiments of the disclosure, the detection duration and the sleep duration of the $i^{th}$ operation cycle may be adaptively determined according to the sensing data collected in the detection duration of the $i^{th}$ operation cycle. In this way, when the sensed target device is relatively unstable, the disclosure may correspondingly prolong the detection duration and/or shorten the sleep duration for the sensor to obtain more sensing data in the $i+1^{th}$ operation cycle. On the other hand, when the sensed target device is relatively stable, the disclosure may correspondingly shorten the detection duration and/or prolong the sleep duration for the sensor to save more power in the $i+1^{th}$ operation cycle. In this way, the battery service life of the sensor may be effectively prolonged, and the convenience of use may thus be improved for system integrators and users.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for adjusting sleep time based on sensing data, adapted for an electronic device, the method comprising:
    disabling a sensor in a sleep duration of an $i^{th}$ operation cycle among a plurality of operation cycles, wherein i is an integer greater than 1;
    enabling the sensor in a detection duration of the $i^{th}$ operation cycle, and obtaining a plurality of sensing data corresponding to the $i^{th}$ operation cycle from the sensor, wherein the plurality of sensing data corresponding to the $i^{th}$ operation cycle are obtained by the sensor sensing a target device in the detection duration of the $i^{th}$ operation cycle, wherein a sum of the detection duration of the $i^{th}$ operation cycle and the sleep duration of the $i^{th}$ operation cycle is a fixed value, which is equal to a time length of each of the operation cycles; and
    determining a detection duration and a sleep duration of an $i+1^{th}$ operation cycle among the plurality of operation cycles based on the plurality of sensing data obtained in the detection duration of the $i^{th}$ operation cycle.

2. The method according to claim 1, wherein a first operation cycle among the plurality of operation cycles only comprises a detection duration.

3. The method according to claim 1, further comprising:
    enabling the sensor in the detection duration of the first operation cycle, and obtaining the plurality of sensing data corresponding to the first operation cycle from the sensor, wherein the plurality of sensing data corresponding to the first operation cycle are obtained by the sensor sensing the target device in the detection duration of the first operation cycle;
    determining a critical value based on the plurality of sensing data obtained in the detection duration of the first operation cycle; and
    setting a detection duration and a sleep duration of a second operation cycle among the plurality of operation cycles as a first default value and a second default value, respectively.

4. The method according to claim 3, wherein determining the critical value based on the plurality of sensing data obtained in the detection duration of the first operation cycle comprises:
    determining a statistical property value based on the plurality of sensing data corresponding to the first operation cycle as the critical value.

5. The method according to claim 1, wherein the detection duration of the $i^{th}$ operation cycle is represented by $T_{1,i}$, the sleep duration of the $i^{th}$ operation cycle is represented by $T_{2,i}$, the detection duration of the $i+1^{th}$ operation cycle is represented by $T_{1,i+1}$, the sleep duration of the $i+1^{th}$ operation cycle is represented by and determining the detection duration and the sleep duration of the $i+1^{th}$ operation cycle among the plurality of operation cycles based on the plurality of sensing data obtained in the detection duration of the $i^{th}$ operation cycle comprises:
    executing at least one of setting $T_{2,i+1}$ to be less than $T_{2,i}$ and setting $T_{1,i+1}$ to be greater than $T_{1,i}$ in response to determining that specific sensing data satisfying a specific condition exists among the plurality of sensing data corresponding to the $i^{th}$ operation cycle; and
    executing at least one of setting $T_{2,i+1}$ to be greater than and setting $T_{1,i+1}$ to be less than $T_{1,i}$ in response to determining that the specific sensing data satisfying the specific condition do not exist among the sensing data corresponding to the $i^{th}$ operation cycle.

6. The method according to claim 5, further comprising:
    determining whether any of the plurality of sensing data of the $i^{th}$ operation cycle exceeds a critical value;
    determining that the specific sensing data satisfying the specific condition exists among the plurality of sensing data corresponding to the $i^{th}$ operation cycle in response to determining that any of the plurality of sensing data of the $i^{th}$ operation cycle exceeds the critical value; and
    determining that the specific sensing data satisfying the specific condition do not exist among the plurality of sensing data corresponding to the $i^{th}$ operation cycle in response to determining that all of the plurality of sensing data of the $i^{th}$ operation cycle do not exceed the critical value.

7. The method according to claim 5, wherein setting $T_{1,i+1}$ to be greater than $T_{1,i}$ comprises setting $T_{1,i+1}$ to be $T_{1,i} \times K$, wherein K is an energy-saving coefficient greater than 1, and $T_{1,i+1} \leq T_{1,i} + T_{2,i}$;
    wherein setting $T_{2,i+1}$ to be less than $T_{2,i}$ comprises setting $T_{2,i+1}$ to be $T_{2,i} - (T_{1,i+1} - T_{1,i})$.

8. The method according to claim 5, wherein setting $T_{1,i+1}$ be to less than $T_{1,i}$ comprises setting $T_{1,i+1}$ to be $T_{1,i}/K$, wherein K is an energy-saving coefficient greater than 1;
    wherein setting $T_{2,i+1}$ to be greater than $T_{2,i}$ comprises setting $T_{2,i+1}$ to be $T_{2,i} + (T_{1,i} - T_{1,i+1})$.

9. The method according to claim 5, wherein before executing at least one of setting $T_{2,i+1}$ to be less than $T_{2,i}$ and setting $T_{1,i+1}$ to be greater than $T_{1,i}$, the method further comprises:
    determining a current energy-saving rate corresponding to the $i^{th}$ operation cycle according to $T_{1,i}$ and $T_{2,i}$;
    setting $T_{2,i+1}$ to be equal to $T_{2,i}$ and setting $T_{1,i+1}$ to be equal to $T_{1,i}$ in response to determining that the current energy-saving rate corresponding to the $i^{th}$ operation cycle has reached an upper threshold; and
    executing at least one of setting $T_{2,i+1}$ to be less than $T_{2,i}$ and setting $T_{1,i+1}$ to be greater than $T_{1,i}$ in response to determining that the current energy-saving rate corresponding to the $i^{th}$ operation cycle has not reached the upper threshold.

10. The method according to claim 1, wherein the target device is a motor device, and the plurality of sensing data comprise a plurality of vibration data from the sensor measuring the motor device.

11. The method according to claim 1, further comprising:
    disabling a transceiver circuit of the electronic device in the sleep duration of the $i^{th}$ operation cycle; and
    enabling the transceiver circuit in the detection duration of the $i^{th}$ operation cycle and controlling the transceiver circuit to transmit the plurality of sensing data obtained in the detection duration of the $i^{th}$ operation cycle.

12. An electronic device for adjusting sleep time based on sensing data, comprising:
    a storage circuit, storing a code; and
    a processor, coupled to the storage circuit and accessing the code to execute:
        disabling a sensor in a sleep duration of an $i^{th}$ operation cycle among a plurality of operation cycles, wherein i is an integer greater than 1;
        enabling the sensor in a detection duration of the $i^{th}$ operation cycle, and obtaining a plurality of sensing data corresponding to the $i^{th}$ operation cycle from the sensor, wherein the plurality of sensing data corresponding to the $i^{th}$ operation cycle are obtained by the sensor sensing a target device in the detection duration of the $i^{th}$ operation cycle, wherein a sum of the detection duration of the $i^{th}$ operation cycle and the sleep duration of the $i^{th}$ operation cycle is a fixed value, which is equal to a time length of each of the operation cycles; and determining a detection duration and a sleep duration of an $i+1^{th}$ operation cycle among the plurality of operation cycles based on the plurality of sensing data obtained in the detection duration of the $i^{th}$ operation cycle.

13. The electronic device according to claim 12, wherein a first operation cycle among the plurality of operation cycles only comprises a detection duration.

14. The electronic device according to claim 12, wherein the processor is further configured to:

enable the sensor in the detection duration of the first operation cycle, and obtain the plurality of sensing data corresponding to the first operation cycle from the sensor, wherein the plurality of sensing data corresponding to the first operation cycle are obtained by the sensor sensing the target device in the detection duration of the first operation cycle;

determine a critical value based on the plurality of sensing data obtained in the detection duration of the first operation cycle; and set a detection duration and a sleep duration of a second operation cycle among the plurality of operation cycles as a first default value and a second default value, respectively.

15. The electronic device according to claim 14, wherein the processor is configured to:

determine a statistical property value based on the plurality of sensing data corresponding to the first operation cycle as the critical value.

16. The electronic device according to claim 12, wherein the detection duration of the $i^{th}$ operation cycle is represented by $T_{1,i}$, the sleep duration of the $i^{th}$ operation cycle is represented by $T_{2,i}$, the detection duration of the $i+1^{th}$ operation cycle is represented by $T_{1,i+1}$, the sleep duration of the $i+1^{th}$ operation cycle is represented by $T_{2,i+1}$, and the processor is configured to:

execute at least one of setting $T_{2,i+1}$ be less than $T_{2,i}$ and setting $T_{1,i+1}$ to be greater than $T_{1,i}$ in response to determining that specific sensing data satisfying a specific condition exists among the plurality of sensing data corresponding to the $i^{th}$ operation cycle; and execute at least one of setting $T_{2,i+1}$ to be greater than $T_{2,i}$ and setting $T_{1,i+1}$ to be less than $T_{1,i}$ in response to determining that the specific sensing data satisfying the specific condition do not exist among the sensing data corresponding to the $i^{th}$ operation cycle.

17. The electronic device according to claim 16, wherein the processor is further configured to:

determine whether any of the plurality of sensing data of the $i^{th}$ operation cycle exceeds a critical value;

determine that the specific sensing data satisfying the specific condition exists among the plurality of sensing data corresponding to the $i^{th}$ operation cycle in response to determining that any of the plurality of sensing data of the $i^{th}$ operation cycle exceeds the critical value; and determine that the specific sensing data satisfying the specific condition do not exist among the plurality of sensing data corresponding to the $i^{th}$ operation cycle in response to determining that all of the plurality of sensing data of the $i^{th}$ operation cycle do not exceed the critical value.

18. The electronic device according to claim 16, wherein the processor is configured to:

set $T_{1,i+1}$ to be $T_{1,i} \times K$, wherein K is an energy-saving coefficient greater than 1, and $T_{1,i+1} \leq T_{1,i}+T_{2,i}$; and set $T_{2,i+1}$ to be $T_{2,i}-(T_{1,i+1}-T_{1,i})$ for setting $T_{2,i+1}$ to be less than $T_{2,i}$.

19. The electronic device according to claim 16, wherein the processor is configured to:

set $T_{1,i+1}$ to be $T_{1,i}/K$ for setting $T_{1,i+1}$ to be less than $T_{1,i}$, wherein K is an energy-saving coefficient greater than 1; and set $T_{2,i+1}$ to be $T_{2,i}+(T_{1,i}-T_{1,i+1})$ for setting $T_{2,i+1}$ to be greater than $T_{2,i}$.

20. The electronic device according to claim 16, wherein before executing at least one of setting $T_{2,i+1}$ to be less than $T_{2,i}$ and setting $T_{1,i+1}$ to be greater than $T_{1,i}$, the processor is further configured to:

determine a current energy-saving rate corresponding to the $i^{th}$ operation cycle according to $T_{1,i}$ and $T_{2,i}$;

set $T_{2,i+1}$ to be equal to $T_{2,i}$ and setting $T_{1,i+1}$ to be equal to $T_{1,i}$ in response to determining that the current energy-saving rate corresponding to the $i^{th}$ operation cycle has reached an upper threshold; and execute at least one of setting $T_{2,i+1}$ to be less than $T_{2,i}$ and setting $T_{1,i+1}$ to be greater than $T_{1,i}$ in response to determining that the current energy-saving rate corresponding to the $i^{th}$ operation cycle has not reached the upper threshold.

21. The electronic device according to claim 12, wherein the target device is a motor device, and the plurality of sensing data comprise a plurality of vibration data from the sensor measuring the motor device.

22. The electronic device according to claim 12, wherein the processor is further configured to:

disable a transceiver circuit of the electronic device in the sleep duration of the $i^{th}$ operation cycle; and enable the transceiver circuit in the detection duration of the $i^{th}$ operation cycle and controlling the transceiver circuit to transmit the plurality of sensing data obtained in the detection duration of the $i^{th}$ operation cycle.

23. The electronic device according to claim 12, further comprising the sensor, coupled to the processor.

* * * * *